United States Patent [19]

Moriyama

[11] 3,833,794

[45] Sept. 3, 1974

[54] FIXING UNIT FOR USE IN A DUPLICATING APPARATUS

[75] Inventor: Munetaka Moriyama, Tokyo, Japan

[73] Assignee: Xerox Corporation, Stamford, Conn.

[22] Filed: Nov. 2, 1972

[21] Appl. No.: 303,297

[52] U.S. Cl. .................. 219/502, 219/492, 219/494
[51] Int. Cl. ............................................. H05b 1/02
[58] Field of Search .......... 219/492, 494, 497, 499, 219/501, 502, 504, 505

[56] References Cited
UNITED STATES PATENTS

| | | | |
|---|---|---|---|
| 3,161,759 | 12/1964 | Gambill et al. | 219/499 |
| 3,558,857 | 1/1971 | Braun | 219/502 |

*Primary Examiner*—J. D. Miller
*Assistant Examiner*—Fred E. Bell

[57] ABSTRACT

Apparatus for controlling the temperature of an infrared heating lamp used for fixing. The lamp is preheated and extra current is diverted through the lamp during fixing. A lamp and photocell arrangement senses input voltage variations and controls the apparatus to maintain the temperature of the heating lamp at a predetermined level.

7 Claims, 1 Drawing Figure

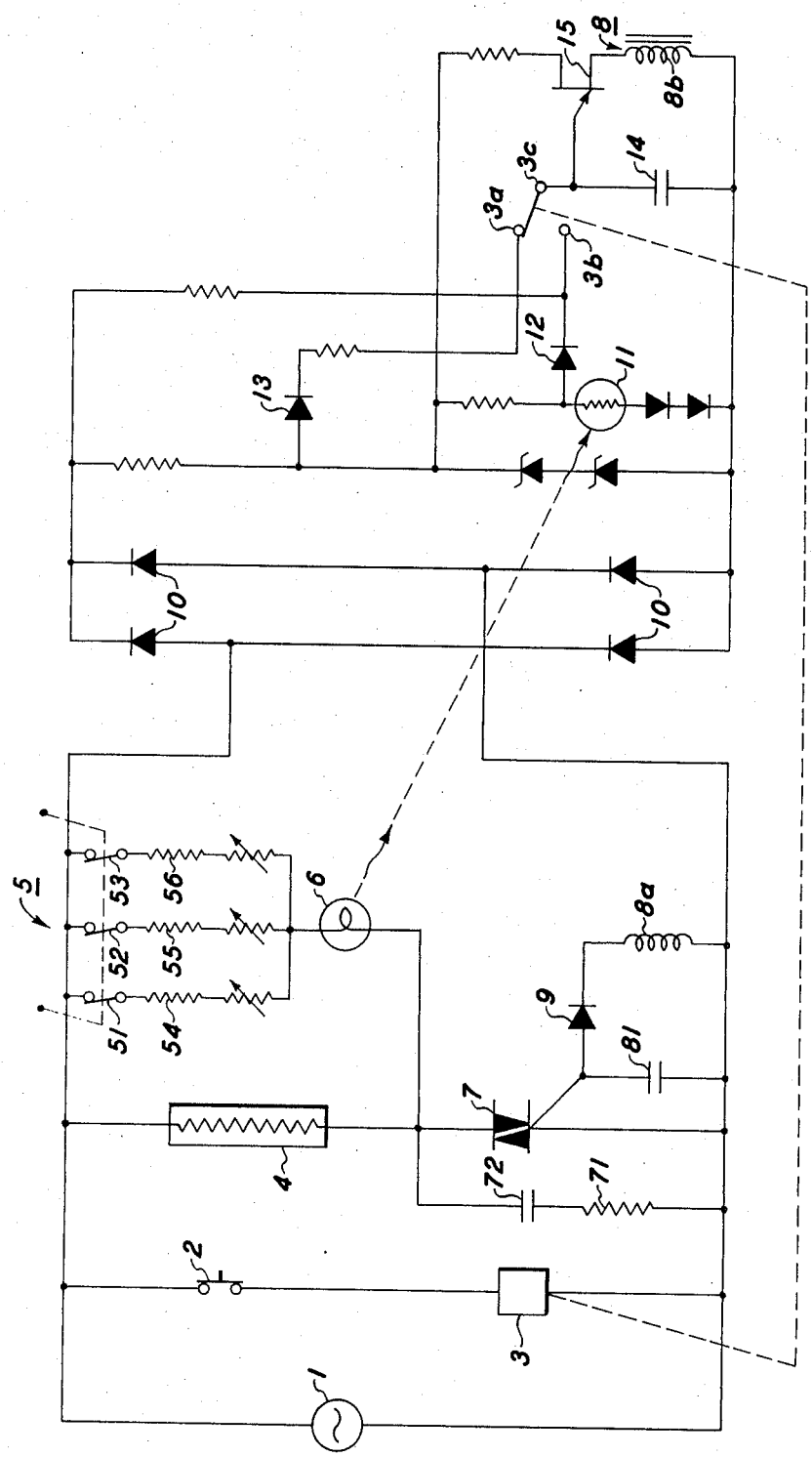

FIXING UNIT FOR USE IN A DUPLICATING APPARATUS

BACKGROUND OF THE INVENTION

This invention relates to fixing apparatus and, more particularly, to apparatus for controlling the temperature of a radiant heat source.

The usual fixing unit for use in a radiant type duplicating apparatus includes a heat source consisting of a plurality of nichrome wire heating elements. In the duplicating operation, the heat source is preheated to a predetermined temperature by supplying power to all the heating elements so that they reach a temperature suitable for fixing. When the predetermined temperature is reached, power to the heat source is reduced. During the fixing, the heat source temperature is automatically controlled to be substantially constant by means of arrangements whereby power to the heat source is applied when the heat source temperature drops below the predetermined temperature. This temperature control, however, is rather gradual in operation because the temperature difference between the "on" and "off" states of the heating elements is comparatively large. Therefore, this causes irregular fixing. To overcome this drawback, a fixing method using an infrared lamp in place of the nichrome wire heating elements has been proposed and employed in practical use. This method, however, had disadvantages such as being affected by the ambient temperature, taking a long time, particularly in winter, from the turning on of the lamp till reaching a fixing temperature, and susceptibility to input voltage fluctuations.

It is therefore an object of the present invention to eliminate the above disadvantages by providing a fixing unit having an infrared ray lamp heating source which is comparatively simple in construction and is not affected by variations in input voltage and temperature.

SUMMARY OF THE INVENTION

In accordance with the principles of this invention, apparatus is advantageously provided for controlling the temperature of an infrared heating lamp utilized for fixing. The heating lamp is preheated by supplying a constant current level upon which are superimposed intermittent current pulses. During the fixing process, the pulse rate is increased to elevate the lamp temperature. A photocell and lamp arrangement sensitive to input voltage variations is also utilized to control the pulse rate and maintain the temperature of the lamp at a predetermined level.

DESCRIPTION OF THE DRAWING

The foregoing will become more readily apparent upon a reading of the following description in conjunction with the drawing which depicts a schematic diagram of an illustrative circuit utilizing the principles of this invention.

DESCRIPTION OF ILLUSTRATIVE EMBODIMENT

Referring to the drawing, reference numeral 1 designates an a-c source, across which is connected a duplicator switch 2 in series with a relay 3. Numeral 4 designates an infrared ray lamp which is in parallel with a resistance circuit 5 capable of being switched to provide plural, illustratively three, radiant heat quantities. For example, the power supplied to the lamp may be selectively switched to 1 kW, 800 W and 500 W, respectively, for use in a high humidity low temperature ambient condition, normal humidity normal temperature ambient condition, and low humidity high temperature ambient condition. Resistance circuit 5 may consist of three independent and parallel switches 51, 52 and 53 in series with respective resistors 54, 55 and 56. Photocell lamp 6 is in series with resistance circuit 5. Lamp 4 is connected in series with a bilateral thyristor 7, which is in parallel with a series circuit of resistor 71 and capacitor 72. Resistor 71 and capacitor 72 are designed for the purpose of normally energizing and preheating infrated ray lamp 4. The control lead of thyristor 7 is in series with diode 9 and inductance 8a, which is the secondary winding of transformer 8, to be described later. Capacitor 81 is connected in parallel with the series circuit of diode 9 and secondary winding 8a of transformer 8. Numeral 10 designates a full-wave diode bridge rectifier, which is connected across a-c source 1 and whose d-c voltage is impressed on photocell 11, which faces photocell lamp 6. Photocell 11 is connected through diode 12 to normally open contact 3b of relay 3, whose normally closed contact 3a is connected through diode 13 to the d-c source of rectifier 10. Movable contact 3c of relay 3 is connected both to capacitor 14 and to the base of uni-junction transistor 15 whose emitter is connected to the primary 8b of transformer 8.

In operation, during the off condition with switch 2 open, infrared lamp 4 is preheated through the circuit of capacitor 72 and resistor 71 and there is no influence of the photocell 11 upon the uni-junction transistor 15 since the former is separated from the latter by the normally open contact of relay 3. In this state, capacitor 14 connected to the base of uni-junction transistor 15 is charged by the current flowing through rectifier 10, diode 13 and normally closed contact 3a of relay 3. When the voltage across capacitor 14 reaches the threshold voltage of uni-junction transistor 15, transistor 15 is triggered to cause current to flow into primary winding 8b of transformer 8, thus inducing an electromotive force across secondary winding 8a of transformer 8. By means of the electromotive force thus induced, capacitor 81 is charged. When the voltage across capacitor 81 reaches the breakdown voltage of bilateral thyristor 7, the series circuit of capacitor 72 and resistor 71 is short-circuited through the firing of thyristor 7, thus increasing the current in lamp 4. In other words, upon the firing of bilateral thyristor 7, a current pulse is added to the infrared ray lamp current over that which would normally flow through capacitor 72 and resistor 71. When uni-junction transistor 15 is triggered, capacitor 14 discharges. Transistor 15 then turns off and allows capacitor 14 to again charge, thereby repeating the cycle. Thus, a series of current pulses, at a rate determined by the charging rate of capacitor 14, is superimposed upon the current which normally flows through capacitor 72 and resistor 71. This maintains lamp 4 in a preheated condition.

When duplicator switch 2 is closed, relay 3 is actuated and its movable contact 3c is thrown to normally open contact 3b. As a result, capacitor 14 is charged through diode 12. When the voltage across capacitor 14 reaches the threshold voltage of uni-junction transistor 15, the base current of transistor 15 flows into primary winding 8b of transformer 8, as mentioned earlier. The circuit values are chosen such that capacitor 14 is charged more quickly through diode 12 than through diode 13. In other words, uni-junction transistor 15 is fired more quickly. With the energization of primary winding 8b of transformer 8, an electromotive force is induced in secondary winding 8a to charge capacitor 81, and when the terminal voltage across capacitor 81 reaches the breakdown voltage of bilateral thyristor 7, the circuit of capacitor 72 and resistor 71 is short-circuited to cause a current pulse to flow through lamp 4, in the same manner as described previously. At this time, however, the series of current pulses occurs at a higher repetition frequency, so that lamp 4 is heated to reach the higher temperature required for fixing. Also at this time, if the voltage of source 1 varies so as to cause fluctuation in the intensity of illumination of the photocell lamp 6, this varies the internal resistance of facing photocell 11 to vary the charging rate of capacitor 14 and hence the timing of firing of uni-junction transistor 15. In this manner, the current flowing through lamp 4 is automatically controlled to maintain a constant fixing temperature.

As has been described in the foregoing, according to the invention, the time preparatory for fixing in the duplicating operation is reduced by preheating an infrared ray lamp with a low current level upon which is superimposed a series of current pulses. During the fixing process the pulse rate is increased to raise the lamp temperature. Further, the circuit is made insensitive to input voltage variations by varying the pulse rate in accordance with input voltage variations.

Thus, a constant fixing condition free from the influence of source voltage variations may be obtained with a single infrared ray lamp, so that it is possible to provide a simple, small-size and economic fixing unit useful in practical applications.

While the invention has been described with reference to its preferred embodiment, it will be understood by those skilled in the art that various changes may be made and equivalents substituted for elements thereof without departing from the true spirit and scope of the invention. In addition, many modifications may be made to adapt a particular situation or material to the teachings of the invention without departing from its essential teachings.

What is claimed is:

1. Apparatus for controlling the temperature of a heat source comprising
    means connected to a power source for supplying current at a constant level to said heat source,
    pulse means for superimposing on said current a series of current pulses at a constant frequency of repetition, and
    control means responsive to a signal indicating a request to raise the temperature of said heat source for controlling said pulse means to operate at an increased frequency of repetition.

2. The apparatus of claim 1 wherein said pulse means includes
    a transistor,
    a capacitor connected to the base of said transistor,
    means for charging said capacitor, said transistor being triggered when said capacitor is charged to a predetermined voltage and providing a discharge path for said capacitor,
    switching means connected to said power source and said heat source, said switching means when enabled increasing the current supplied to said heat source, and
    means responsive to the triggering of said transistor for enabling said switching means.

3. The apparatus of claim 2 wherein said switching means includes a bilateral thyristor.

4. The apparatus of claim 3 wherein said enabling means includes
    a transformer having a primary winding and a secondary winding, said primary winding being connected in the discharge path of said capacitor, and
    a second capacitor connected to the control lead of said thyristor and in parallel with said secondary winding.

5. The apparatus of claim 2 wherein said control means includes means for controlling the charging rate of said capacitor.

6. The apparatus of claim 1 further comprising means responsive to voltage level variations of said power source for varying the frequency of repetition of said pulse means.

7. The apparatus of claim 6 wherein said varying means includes
    a lamp connected to said power source, the light output of said lamp depending upon the voltage level of said power source, and
    a photocell facing said lamp and connected to said pulse means, the internal resistance of said photocell varying in accordance with the intensity of light striking said photocell from said lamp.

* * * * *